United States Patent
Dixon

[15] 3,652,951
[45] Mar. 28, 1972

[54] METHOD OF PRODUCING LASER OUTPUT ENERGY PULSES OF DESIRED PULSE WIDTH

[72] Inventor: Edgar O. Dixon, Wayland, Mass.

[73] Assignee: American Optical Corporation, Southbridge, Mass.

[22] Filed: Apr. 28, 1969

[21] Appl. No.: 819,660

[52] U.S. Cl. ............................................................330/4.3
[51] Int. Cl. ..........................................H01s 3/02, H01s 3/09
[58] Field of Search.....................................330/4.3; 331/94.5

[56] References Cited

UNITED STATES PATENTS

| | | | |
|---|---|---|---|
| 3,247,459 | 4/1966 | Van Overbeer | 330/4.3 |
| 3,312,905 | 4/1967 | Lewis | 330/4.3 |
| 3,453,559 | 7/1969 | Sharp et al. | 330/4.3 |
| 3,471,409 | 10/1969 | Haynes, Jr. | 330/4.3 |
| 3,484,713 | 12/1969 | Fenner | 330/4.3 |
| 3,493,893 | 2/1970 | Kaiser et al. | 330/4.3 |
| 3,504,300 | 3/1970 | Mazelsky et al. | 330/4.3 |

Primary Examiner—Rodney D. Bennett, Jr.
Assistant Examiner—N. Moskowitz
Attorney—William C. Nealon, Noble S. Williams and Robert J. Bird

[57] ABSTRACT

A system for generating amplified fluorescent energy output pulses of desired width, especially those intermediate in width between those of long and short pulse modes of operation. The system comprises a low power generator, a means for shaping the generator output into the desired pulse shape and width, a power amplifier, and stabilizing means for the generator-amplifier system, so that undesired oscillations are not permitted to begin.

6 Claims, 2 Drawing Figures

PATENTED MAR 28 1972　　　　　　　　3,652,951

INVENTOR.
EDGAR O. DIXON
BY
William C. Conner
ATTORNEY

METHOD OF PRODUCING LASER OUTPUT ENERGY PULSES OF DESIRED PULSE WIDTH

BACKGROUND

Lasers, otherwise referred to as optical masers by some, are light amplifying or light oscillation producing devices and are specifically adapted to provide an output of high intensity coherent monochromatic light. Such light is produced in a laser by photonic emission from the active ions or atoms of a body composed of so-called laser material. The present invention is especially concerned with lasers of the glass type which are doped with certain rare earth oxides. A full background discussion of this type of laser may be found, for example, in copending U.S. application, Ser. No. 168,012 of Elias Snitzer, filed Jan. 16, 1962 and owned by the same assignee as the instant application. The disclosure thereof is incorporated herein by reference.

Lasers are commonly operated in one of two modes:

a. the long pulse or quasi-continuous mode, in which laser material within a Fabry-Perot cavity is pumped for a time on the order of 1 millisecond, and the laser produces a useful output throughout most of the pumping time. This output is most commonly heavily spiked in time, in a more or less random fashion.

b. the short pulse, Q-switched, or Q-spoiled mode, in which the laser material is pumped over a similar time during which the Fabry-Perot cavity losses are arranged to be very high so that laser oscillations cannot occur, and near the end of which pumping time the cavity losses are suddenly removed so that the stored laser energy is emitted in a small fraction of a microsecond.

For some special applications it is desirable to be able to generate a significant amount of laser energy in pulse widths intermediate between those of the long pulse and short pulse modes which pulse width is mathematically definable with relative ease. The pulse output should be free of the spiking often associated with the long pulse mode of operation. For other applications it is desirable to produce a laser pulse of a desired width.

OBJECTS OF THE INVENTION

It is therefore an object of the invention to provide for the generation of a pulse of laser energy of intermediate width which is mathematically definable with relative ease.

It is a further object to provide for the generation of a significant amount of laser energy in pulse widths intermediate those of long pulse and short pulse modes of laser operation.

It is yet a further object of the invention to provide a novel system for producing pulses of desired width.

BRIEF SUMMARY OF THE INVENTION

Fluorescence in glass laser rods of the type discussed above is smooth in time. Thus, by pumping a rare earth doped glass rod and allowing it to fluoresce, i.e., not inducing resonance or oscillation, one obtains a long smooth energy curve or pulse. There is provided means for chopping or selecting a relatively small intermediate width pulse from this energy curve. For example, means is provided to chop a 1 millisecond piece of fluorescence at the peak of the curve (one could chop 10 or 100 milliseconds, etc., as desired). This produces a weak signal of laser light which is substantially square in time. Since the signal is narrow and weak, it is sent through a series of laser amplifiers, each of which provides increased gain. Between the amplifiers and after the initial fluorescing rod or generator there is inserted so-called electro-optical light valves or one-way transmission elements, such as Faraday rotators, so the system is stable, i.e., the generator and amplifier arrangement is combined in such a manner as to prevent undesired oscillations to begin.

In amplifying the pulse the square wave configuration is modified due to depletion of stored energy in the laser amplifier and thus one obtains lower or reduced gain during the latter part of the pulse. The pulse configuration which results is no longer square but rather has a rearward slope with time. There is therefore provided a ramp generator in the system which provides a reverse slope to the pulse, and one ends up with a square pulse.

The foregoing system is extremely useful for testing of laser glasses. It is a particularly useful laboratory tool for studying the characteristics of laser light.

THE DRAWINGS

FIG. 1 is a schematic arrangement according to the invention including a low-power generator, means for shaping the generator output, and a power amplifier and stabilizing means; and FIG. 2 is a schematic end view of the final amplifier system of FIG. 1.

DETAILED DISCUSSION OF THE INVENTION

Under some conditions it is possible to operate a laser in the long pulse mode, free of spiking over a portion or all of the output pulse. And it is possible to select a portion of the output by chopping or shuttering to obtain the intermediate pulse widths desired, or alternatively to reduce the pumping time and therefore the output pulse width. Unfortunately, with available pump sources of fixed brightness, output energy will fall off with output pulse width. Furthermore, it so happens that spike-free operation in the long pulse mode is obtained only with broad output beamwidths. For these two reasons, then, only very low radiances (low energies into broad angles) can be obtained in the intermediate pulse widths by shortening the normal spike-free, long pulse mode of operation.

On the other hand, intermediate pulse widths cannot be generated in the short pulse mode of operation, since the pulse widths obtained are related to the cavity buildup and discharge times, which for any practical sized system are in the range of fractional microseconds.

OBTAINING AN INTERMEDIATE WIDTH PULSE

In the paragraphs which follow, a method is described which permits the generation of high energies free of spiking into narrow output beamwidths in arbitrarily adjustable pulse times intermediate between those of the long and short pulse modes of operation.

In brief, a typical (but simplified) system consists of a low-power generator, a means for shaping the generator output into the desired pulse shape and width, a power amplifier, and a means to stabilize the generator-amplifier system so that undesired oscillations are not permitted to begin.

In the described system, the generator is an arbitrary volume of laser material (not arranged in a resonant cavity) which is pumped in such a way that spontaneous emission is generated for a time long compared to the desired intermediate pulse widths. Only a portion of the spontaneous emission need be used in an arbitrarily small acceptance angle, although, of course, the magnitude of that portion of spontaneous emission is directly related to the solid angle of acceptance.

Mathematically, $P_{sp}(t) = k$ where $P_{sp}(t)$ = spontaneous emission power (1)

$t$ = time $k$ = constant

The means of shaping the generator output can be optical or mechanical shutters or choppers or electro-optical devices such as Kerr cells, Pockel cells, ultrasonic cells or the like, as long as the transmission function of the control element can be programmed in an arbitrary way within the time interval of the pulse width desired.

$\sigma(t) \neq k$ (2)

where $\sigma(t)$ = transmission function of control elements.

The power amplifier unit is an arbitrary volume of laser material, pumped in such a way that it exhibits gain to the portion of amplified spontaneous emission permitted to pass through the control element. If the total output energy obtained is not too large, the output will be a faithful reproduction of the controlled input but at a higher power level, and the gain obtained can be expressed as $$\text{Gain} = P_{out}(t)/P_{in}(t)\, \sigma(t) = e^{B_s E_s l} \quad (3)$$

where $B_s$ = specific gain coefficient of the laser material
$E_s$ = energy stored per unit volume in the laser material
$l$ = length of laser material in the direction of energy transit.

The means for stabilization of the generator-amplifier system to prevent undesired oscillations includes state of the art techniques such as tilted rod ends and optical elements to remove Fresnel reflections from the optical path, roughened cylindrical surfaces and/or absorbing claddings to inhibit the generation of spurious modes, and the use of one-way transmission elements such as Faraday rotators.

The foregoing method of obtaining intermediate pulse widths is adequate as long as the total output energy required is small—that is, as long as amplifier gain is independent of the output energy abstracted from the amplifier.

OBTAINING OTHER BUT PREDICTABLE PULSE WIDTHS

It is interesting to note that the described system under the condition expressed above will also produce short and long pulse widths, as well as the intermediate pulse widths. When the total amplifier output energy is great enough to influence amplifier gain through appreciable depletion of the stored energy, then a phenomenon known as pulse sharpening occurs. Since the earlier photons in the input pulse will experience the full amplifier gain, the later photons experience a lesser gain which falls off exponentially with stored energy depletion (see Equation 3), a substantial distortion or narrowing of the output pulse appears which becomes intolerable at the high output energies required. It is this distortion or pulse sharpening which has heretofore limited the use of power amplifiers to short pulse systems, or to the amplification of longer trains of short pulses.

If Equation 3 is revised to described the effects of energy depletion, $$P_{out}(t) = P_{in}(t)\sigma(t)e^{\frac{B_s}{A} A E_s l \int (P_{out} - P_{in}) dt} \quad (4)$$

where $A$ = cross-sectional area of amplifier.

Since it is assumed desirable to hold output power constant over the pulse time, the expression can be simplified to $$dE_{in} = Ke^{(kt - E_{in})} dt \quad (5)$$

From Equations 4 and 5, it is clear that in the presence of stored energy depletion, output power can be held constant over the pulse time either a. by adding to stored energy (and therefore gain) by additional pumping during the pulse time, or
b. by shaping the input function (spontaneous emission) during the pulse time in such a way that its increase in value just offsets the decreased gain due to depletion, or
c. a combination of (a) and (b).

The solution to Equation 4 gives the time-dependent functions for either stored energy ($E_s$) or the shaped spontaneous emission ($P_{in}(t)\sigma(t)$) required for constant output power. In the first case, energy is added to storage at a constant rate equal to that of depletion, and systems can be designed and constructed to do this for the longer pulse times of approximately 100 microseconds or greater. For considerably smaller pulse times, little energy can be added to storage during the pulse interval, and shaping of the input power must be adopted. This function (from Equation 4) will be a modified exponential.

In one numerical example, and for one neodymium doped glass, shaping the input function over an amplitude ratio of 100/1 permits the generation of output pulse energies of approximately 70 joules/cm.$^2$ in an output pulse of arbitrary width. In the same system without shaping, the output is limited to approximately 10 joules/cm.$^2$ before pulse sharpening becomes excessive.

DETAILED DESCRIPTION OF THE DRAWINGS

Figures 1, 2:
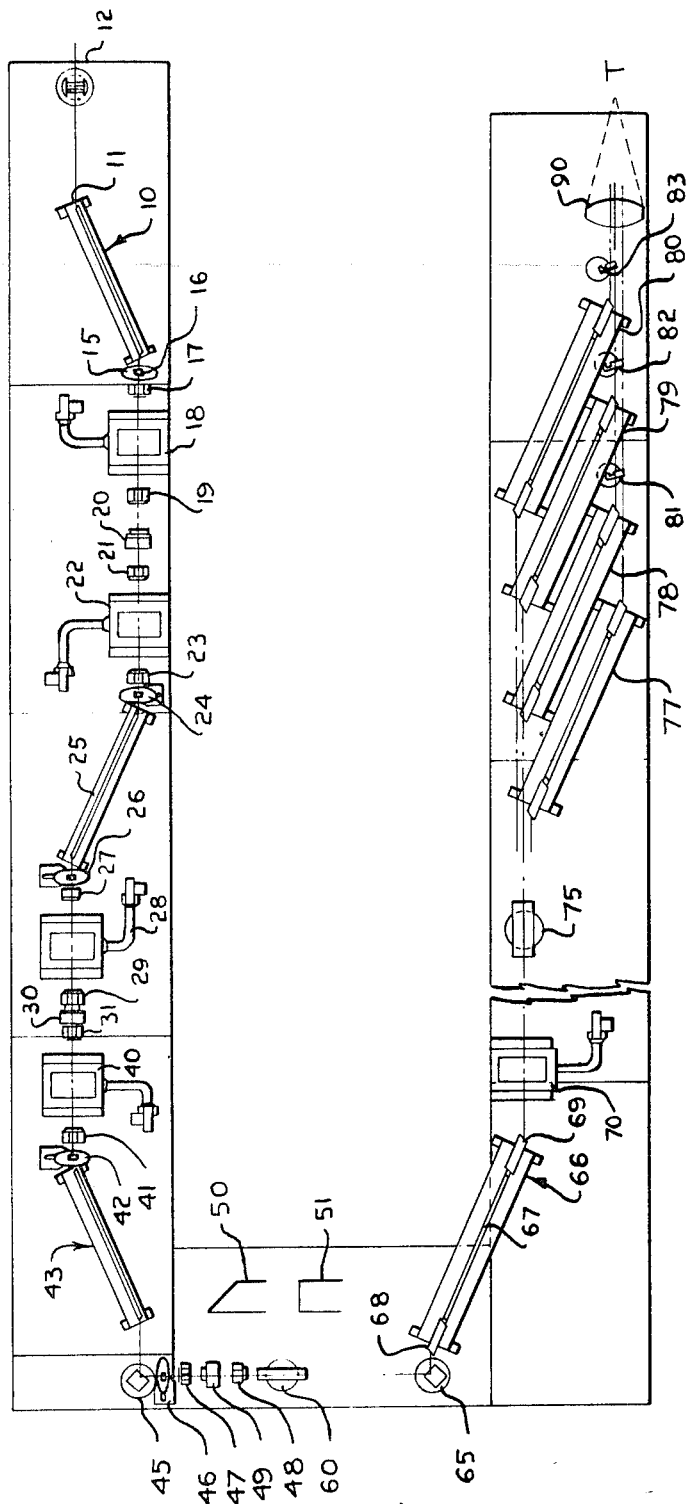

In the following paragraphs there is described an exemplary arrangement of parts which can be used to practice the invention.

In FIG. 1 there is shown a laser assembly 10 which serves to generate the initial output signal and includes a Brewster ended rod approximately 1 meter long, 1 centimeter in diameter and having a cladding. The outside diameter of the cladding is 15 millimeters. The rod is pumped in a conventional manner and since there are no end mirrors or comparable energy-reflecting devices, the laser fluoresces in all directions. However, since there is more gain axially, the most substantial fluorescence will be out the ends. Energy output from the end 11 is absorbed by a stack of attenuator plates 12. With neodymium doped laser rods, in which case the fluorescence is at 1.06 microns, the attenuator plates are glass heavily doped with trivalent iron.

Fluorescence or output energy from the other end of the laser 10 passes through the aperture stop or plate 15. This plate has a rectangular opening 16 substantially centrally thereof which is about 1 centimeter by 7 millimeters. The plate prevents broad angle feedback and may be made of a material similar to that used to fabricate the attenuator stack 12. The signal passing through the plate 15 is polarized by a calcite polarizer 17 before being passed through the Faraday rotator 18. Proceeding from right to left across FIG. 1 in optical alignment with the aperture plate 15, polarizer 17 and Faraday rotator 18, we have an additional calcite polarizer 19, Kerr cell 20, and another calcite polarizer 21 and Faraday rotator 22. The Kerr cell 20 is the device which chops out the desired substantially square pulse from the signal being emitted from laser 10. As mentioned above, the Faraday rotators are to prevent undesirable return oscillation.

In the system subsequent to the Faraday rotator 22, is another calcite polarizer 23, aperture plate 24, and a second laser 25. The laser 25 is in all respects similar to generator 10. The output from the laser 25 is passed through aperture stop or plate 26 (the same as 15), calcite polarizer 27, Faraday rotator 28, calcite polarizer 29, another Kerr cell 30 and yet another calcite polarizer 31. As can be seen, the repetition of parts provides for additional gain or output and thus signal amplification.

The train of elements in the beam or signal path then include an additional Faraday rotator 40, calcite polarizer 41, aperture plate 42 (the same as 15) and yet another laser 43. In this embodiment, the generator 43 is also of neodymium doped laser glass as were lasers 10 and 25 but is unclad and has an 18-millimeter outside diameter.

In my exemplary embodiment I have shown an arrangement for folding the system which includes a gold mirror 45 and aperture plate 46. The beam or signal passing through the plate 46 is directed through a pair of calcite polarizers 47 and 48 having equispaced therebetween a Kerr cell 49 which serves as a ramp generator and which modifies a signal having the configuration 50 to obtain a signal which has a configuration substantially as that shown at 51.

The output of polarizer 48 is passed through a 2X afocal telescope assembly 60. The telescope is used to increase signal diameter from 18 millimeters to 36 millimeters while at the same time decreasing beam divergence by a factor of 2. This serves to reduce energy density, lower beam divergence, and allows coupling to a larger diameter rod. An additional gold mirror 65 again folds the system and passes the beam to a laser preamplifier assembly 66. In this preferred example, I have shown schematically as a preamplifier assembly a neodymium doped glass laser rod 67 totally immersed in water. Since it is immersed, it is associated with a pair of laser glass windows 68 and 69 to couple the beam in and out of the laser cavity.

The output from the preamplifier passes through still another Faraday rotator 70 and thence to an additional afocal telescope 75. In my example, I provide a telescope of sufficient power to step the beam up to approximately 5 inches across. The output from the afocal telescope 75 is focused on the arrangement of lasers 76 which together serve as a final amplifier stage. This final amplifier stage includes four identical laser assemblies 77, 78, 79 and 80, identical in all respects to the laser preamplifier 66. In the output beam or signal paths of assemblies 78, 79 and 80 there is provided adjustable rotating prisms 81, 82 and 83 which couple the outputs. The combined or coupled outputs pass through a lens 90 focusing the resultant signal on a target.

It should be understood that the foregoing drawings and description of the drawings (and the drawings themselves) are schematic and exemplary only.

Having thus described the invention in detail and with sufficient particularity as to enable those skilled in the art to practice it, what is desired to have protected by Letters Patent is set forth in the following claims.

I claim:

1. A system for generating high energy laser output pulses of substantially square shape comprising in combination a spontaneous emission power generator, means for shaping the generator output into a desired pulse shape and width, a power amplifier for said desired pulse and stabilizing means optically interspersed through the generator-amplifier combination so that undesired oscillations are not permitted.

2. The arrangement of claim 1 in which said power generator is a low power one and consists of a fluorescing rod.

3. The arrangement of claim 2 in which said rod is a rare earth oxide doped glass rod.

4. The arrangement of claim 1 in which the low-power generator and the amplifier means consist of rare earth oxide doped laser glass.

5. The arrangement of claim 4 in which said laser glass is neodymium doped laser glass.

6. The arrangement of claim 1 in which said amplified fluorescent output is a pulse in width intermediate between a long pulse of the type formed when a Fabry-Perot cavity is pumped and the pulse generated when a laser is Q-switched.

* * * * *